Figure 1:
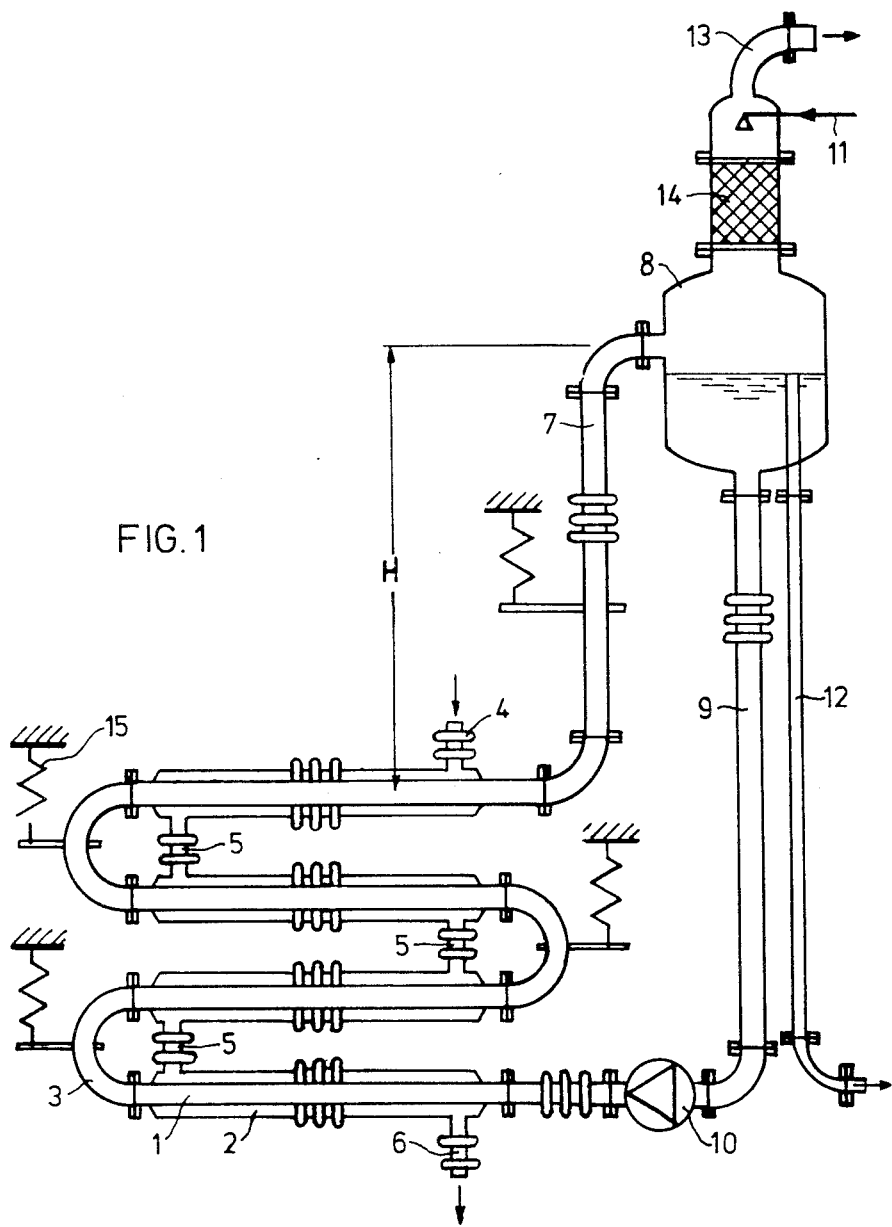

United States Patent [19]

Forter et al.

[11] 4,274,910
[45] Jun. 23, 1981

[54] EVAPORATOR FOR CONCENTRATING MINERAL ACID, PARTICULARLY SULPHURIC ACID

[75] Inventors: Hansruedi Forter, Ormalingen, Switzerland; Jürgen Groening, Siegburg, Fed. Rep. of Germany; Hans L. Kühnlein, Fuellinsdorf; Hans R. Küng, Frenkendorf, both of Switzerland; Joachim Maas, Bergheim; Karl-Heinz Schultz, Krefeld, both of Fed. Rep. of Germany

[73] Assignee: Bayer Aktiengesellschaft, Leverkusen, Fed. Rep. of Germany

[21] Appl. No.: 158,422

[22] Filed: Jun. 11, 1980

[30] Foreign Application Priority Data

Jun. 13, 1979 [CH] Switzerland ......................... 5513/79
May 16, 1980 [DE] Fed. Rep. of Germany ....... 3018662

[51] Int. Cl.³ .............................................. B01D 1/02
[52] U.S. Cl. .................................. 159/1 C; 159/2 R; 159/DIG. 15; 159/DIG. 19; 203/86
[58] Field of Search ............... 159/DIG. 15, DIG. 19, 159/1 C, 2 R; 203/86, 88

[56] References Cited

U.S. PATENT DOCUMENTS

| | | | |
|---|---|---|---|
| 1,854,327 | 4/1932 | Baum | 203/86 |
| 3,294,650 | 12/1966 | Manteufel | 159/DIG. 15 |
| 4,014,735 | 3/1977 | Guth et al. | 159/DIG. 15 |

*Primary Examiner*—Norman Yudkoff
*Attorney, Agent, or Firm*—Sprung, Felfe, Horn, Lynch & Kramer

[57] ABSTRACT

The invention procides a circulation evaporator for concentrating mineral acid, particularly sulphuric acid, comprising parts of, or at least coated with, enamel, characterized by a heat exchanger for heating the acid comprising at least one acid feed pipe provided with an enamel layer, means being provided to maintain the compressive stress in the enamel layer under all working conditions, said acid feed pipe being connected at its inlet end to a circulation pump and at its outlet end to a flash evaporator for concentrating the heated acid, this evaporator being connected by a circulation pipe to the pump inlet and to means for introducing the crude acid, for discharging the concentrate and for carrying away the vapors.

6 Claims, 5 Drawing Figures

EVAPORATOR FOR CONCENTRATING MINERAL ACID, PARTICULARLY SULPHURIC ACID

This invention relates to an evaporator for concentrating mineral acid, particularly sulphuric acid, comprising parts of, or at least coated with, enamel. In the context of the invention, the term "enamel" applies to glass-like coatings which are acid-resistant and capable of withstanding fluctuating temperatures.

The high resistance of quartz, glass and enamel to the corrosive effect of acids is known. However, there is a considerable danger of hairline cracks being formed in the enamel layer under certain working conditions, particularly during the transfer of heat.

Enamel coatings are applied to steel at elevated temperature. On account of the different thermal expansion coefficients of the steel support and the enamel coating, a compressive stress is developed in the enamel layer on cooling. This stress is desirable per se and is necessary for preventing the formation of cracks in the enamel layer. At an ambient temperature of 25° C., the compression of the enamel layer corresponding to this compressive stress (100%) amounts to approximately 0.0015 m/1 m. The compressive stress increases with decreasing temperature and decreases with increasing temperature, so that it assumes a zero value for an average temperature of the order of 400° C.

In known evaporators, the effect of various factors encountered in practical operation is that, even at low mean temperatures, the compressive stress becomes zero or even negative, which almost inevitably results in the unwanted hairline cracks. These factors include, for example, the transfer of heat to the medium to be treated from the steel side through the enamel layer. Under the effect of the known temperature profile characterising the transfer of heat, the enamel layer has a lower mean temperature than the steel layer, with the result that the compressive stresses in the enamel layer are reduced in comparison with the stationary state. This phenonemon present in any heat exchanger is further adversely affected by uneven heating or cooling of the enamel-coated wall, for example due to the fact that the supply of heat from the steel side is irregular or to the fact that the cooling effect of the enamel layer side is uneven on account of encrustation of this layer or on account of irregular flow of the medium to be heated or its partial evaporation.

Accordingly, an object of the present invention is to provide an evaporator which enables the formation of hairline cracks to be avoided despite high working temperatures approaching 350° C. To this end, the evaporator according to the invention is characterised by a heat exchanger for heating the acid comprising at least one tubular duct which is provided with an enamel coating under compression and which is connected at its inlet end to a circulating pump and at its outlet end to a flash evaporator for concentrating the heated acid, the flash evaporator being connected by a circulation pipe to the pump inlet and to means for introducing the crude acid, for discharging the concentrate and for carrying away the vapours.

By virtue of this arrangement, which provides for continuous circulation, it is possible, even when concentrating the sulphuric acid up to the azeotropic point of 98.3% at temperatures of the order of 320° C., to maintain a residual compression according to the invention in the enamel layer of at least 20% of that compression which is present in the enamel layer at room temperature. This residual compression according to the invention of at least 20% prevents the formation of hairline cracks so that the enamel layer satisfactorily protects the tubular duct of the heat exchanger against the corrosive effect of the hot, highly concentrated acid. Since no evaporation takes place in the heat exchanger, i.e. since no vapour bubbles leading to local pressure surges or overheating are formed either, and since in addition the circulation principle provides for particularly uniform and relatively slow heating of the acid by virtue of relatively small temperature differences, which also enables encrustation of the enamel layer with deposits from the generally contaminated acid to be avoided through the selection of a sufficiently high rate of circulation, complete reduction of the above-mentioned residual compression in the enamel layer can be reliably avoided. Now, a compressive stress present in the enamel layer under given process conditions could also be reduced through deformation of components of the apparatus due to mechanical influences (for example deflections) or thermal influences in such a way that elongation and, hence, a reduction in compressive stressing or even a tensile stress can occur on the enamel side. Avoiding unwanted deformation of this type is crucially important, particularly in the region of the heat exchanger, because, as already explained, the compressive stress in the enamel layer in this part of the apparatus is in any case already reduced by the transfer of heat and the temperature gradients thus formed, so that any further reduction by deformation must be strictly avoided. According to the invention, this is guaranteed in thick-walled stable heat exchanger tubes with a flexible jacket for the heat carrier medium.

Figure 2:
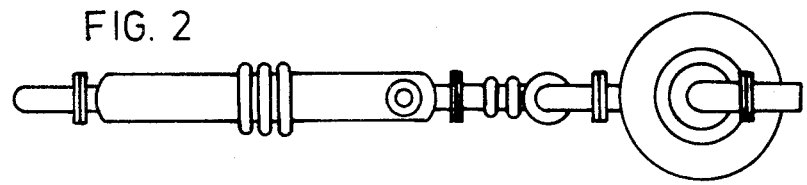

The apparatus according to the invention is illustrated in FIGS. 1 and 2. The illustrated circulation evaporator for concentrating mineral acid, particularly sulphuric acid, consists of one or more enamelled tubes 1 arranged one behind the other which are provided with a double jacket 2 for circulating a heating medium in countercurrent to the acid. The individual tubes 1, which in this example of the embodiment lie in a vertical plane, are interconnected in series by tube bends 3. At their outlet ends, the heat exchanger tubes 1 are connected by a riser to an evaporation vessel 8, from which a circulation pipe 9 leads to the suction side of a circulation pump 10, of which the pressure nozzle communicates with the lowermost heat exchanger tube 1.

The thin acid is delivered to the evaporation vessel 8 of the apparatus through a feed pipe 11, whilst the concentrated acid continuously issues from the vessel 8 through an overflow pipe 12. In the illustrated example, the thin acid initially passes through a rectification column 14 in countercurrent to the ascending vapours which leave the apparatus through an outlet 13.

The heating medium, preferably heat carrier oil (steam may also be used where temperatures in the lower range are applied), enters the double jacket 2 of the last heat exchanger tube 1 through an inlet 4 and passes through a connecting pipe 5 into the next double jacket 2, leaving the apparatus at its lower end through an outlet 6.

Figure 3A:
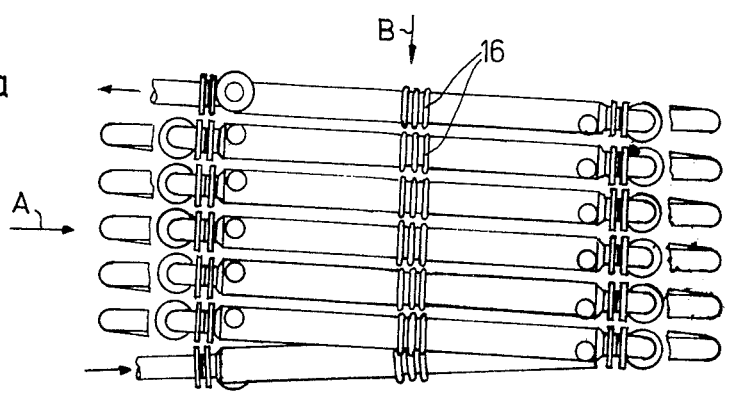
Figure 3B:
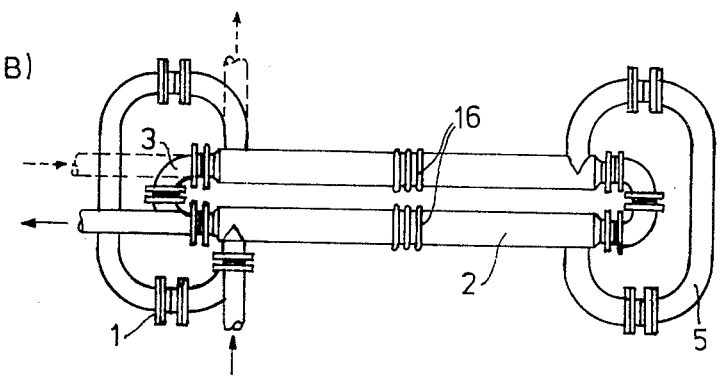
Figure 3C:
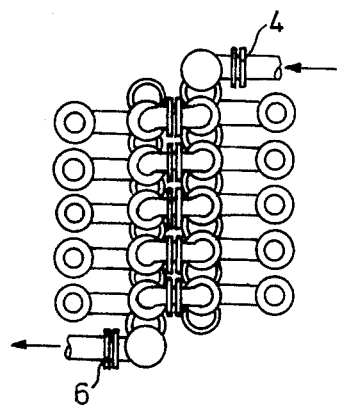

In one preferred variant, the straight heat exchanger tubes are connected by 90° tube bends in such a way that, overall, a spiral structure is formed, as shown in FIG. 3.

Now, the crucial aspect of the apparatus according to the invention is that it is possible to fulfill every precondition for guaranteeing the residual compressive stress required for avoiding cracks in the enamelled layers.

To this end, reference is made above all to the overall temperature profile which, in the presence case, may be established through the fact that the acid automatically flows past the heat exchanger surfaces at such a predetermined rate that no solids are deposited on those surfaces and no evaporation takes place on the heat exchanger surfaces, the acid instead being merely heated. For this reason, a multiple of the amount of acid to be concentrated is circulated in the apparatus in accordance with the invention and, at the same time, provision is made to ensure that the static pressure prevailing at the outlet end of the last heat exchanger tube is high enough to avoid evaporation, taking the temperature of the acid into account. In either case, this result may be achieved by suitably selecting the height H of the riser 7. Accordingly, the acid heated in the heat exchangers only begins to evaporate to any extent as it ascends through the riser 7, most of the evaporation taking place in the evaporation vessel 8.

Exact maintenance of the temperature profile is also influenced from the heating medium side and, by suitably selecting the temperature of the heating medium on entry at the inlet 4 and the flow volume, it is possible to limit the temperature difference between the heat carrier and the acid to that value which still guarantees maintenance of the compressive stress of 20% required in the enamel layer in accordance with the invention. The higher the mean operating temperature, the lower the permitted temperature difference and vice versa.

The temperature differences between the acid and the heat carrier medium are preferably automatically regulated or rather limited so that an optimal permitted temperature at which the 20% residual compression is still present is guaranteed for each operational state. In this way, it is possible as already mentioned to avoid hairline cracks in the enamel layer and, at the same time, to reach the highest permitted heat flow densities so that the enamel-coated apparatus may be economically used. The maximum permitted temperature differences are, of course, determined by the flow conditions and by the heat transfer coefficients so that their exact control is also important.

According to the invention, it is essential to maintain a residual compression or residual compressive stress in the enamel layer under all working conditions. This residual compression or residual compressive stress should be as high as possible under the particular working conditions and preferably no less than 0.0003 m/1 m. In very special cases, however, lower residual compressive stresses are also permissible, but only if there is no danger of deformation and other adverse effects, namely down to about 0.00015 m/1 m, i.e. at least 10% of the original compressive stress should still be present.

According to the invention, the rate of flow of the acid in the heat exchanger tubes may be varied over a range from 0.4 to 4 m/second. A rate of flow of from 0.8 to 1.2 m/second is preferred, because at flow rates in this range solids remain in suspension.

In addition, measures are taken in the apparatus illustrated to avoid unwanted deformation by mechanical or thermal effects on the enamelled workpieces. These measures include axial compensators 15 in the acid circulation pipes 1, 7, 9 as well as the compensators 16 in the connecting pipes 4, 5, 6 and double jackets 2 for heat carriers. The group of heat exchanger tubes 1 itself is spring-mounted, as shown at 17.

It is also possible to coat the evaporation vessel 8 and the pipes 7 and 9 with enamel. However, the evaporation vessel 8 and the circulation pump could consist of or, for example, be lined with an acid-resistant material.

The apparatus according to the invention is further illustrated by the following Examples.

EXAMPLE 1

2409 kg/h of sulphuric acid containing 41.5% by weight of $H_2SO_4$ are delivered through the feed pipe 11 at a temperature of 50° C., 1323 kg/h of 75% sulphuric acid having a temperature of 185° C. leaving the apparatus through the overflow pipe 12.

Accordingly, the lower part of the evaporation vessel 8 contains acid having a temperature of 185° C. and a concentration of 75% of $H_2SO_4$. A quantity of 91500 kg/h is circulated by the circulation pump 10, which gives a flow rate of 1 meter per second providing the diameter of the heat exchanger tubes is suitably selected. At the entrance to the first heat exchanger tube, the temperature is approximately 185° C., at the outlet of the second heat exchanger tube the temperature is 205° C., the static pressure at this point is 1070 Torr (1.44 bar) and the pressure prevailing in the evaporation zone of the vessel 8 amounts to 760 Torr (1.013 bar). In this Example, the heat exchanger tubes are heated by saturated steam under 30 bars abs and, under the described working conditions, 35% of the original compressive stress prevails in the enamel layer at the entrance to the first heat exchanger tube, whilst a residual compressive stress of 40% prevails at the exit from the last heat exchanger tube.

EXAMPLE 1

Preconcentration stage 41.5+75% $H_2SO_4$

Conditions in the evaporation vessel 8:

| | |
|---|---|
| Concentration | X = 75% $H_2SO_4$ |
| Temperature | t = 185° C. |
| Pressure | p = 760 Torr    1.013 bar abs |

Sulphuric acid in the heat exchanger:

| | |
|---|---|
| Entry temperature | t1 = 185° C. |
| Exit temperature | t2 = 205° C. |
| Exit pressure | p2 = 1.44 bars abs |

Circulation volume for 24 t/day (1000 kg/h) of $H_2SO_4$ 100% output in the case of concentration from 41.5 to 75% of $H_2SO_4$.

$\sqrt{U_1} = 57.2$ m³/h at t=185° C.

~86,800 kg/h

Heating medium (saturated steam)

| | |
|---|---|
| Pressure | p = 30 bars abs |
| Condensation temperature | t = 234° C. |
| Quantity* | m = 2000 kg/h |

*based on the above output utilising only the heat of condensation.

Enamel compression:

For an acid flow rate of 1 m/sec., a residual compression of $0.52 \cdot 10^{-3}$ m/1 m is still present.

EXAMPLE 2

1333 kg/h of 75% sulphuric acid having an entry temperature of 185° C. are to be concentrated to 98% $H_2SO_4$. A pressure of 60 Torr (0.07 bars abs) prevails in the evaporation vessel 8 and the concentrated acid has a temperature of 240° C. A quantity of 29,000 kg/h (17.9 m³/h) is circulated by the circulation pump 10 and heated to 260° C. in the heat exchanger tubes. The pressure at the exit of the last heat exchanger tube amounts to 410 Torr (0.55 bar abs).

The heat exchanger tubes are heated by heat carrier oil which enters at 4 with a temperature of 310° C., as shown in FIG. 1, flows in countercurrent to the acid and leaves the apparatus through the outlet 6 with a temperature of 290° C. Under these working conditions, the residual compression amounts to 27% at the entrance to the first heat exchanger tube and to 21% at the exit from the last heat exchanger tube. In this example, the thin acid has an iron sulphate content of 200 ppm, based on 100% acid. However, only about 20 ppm are soluble in 98% acid at a temperature of 240° C. Thus, a considerable proportion is precipitated in solid form. In the apparatus according to the invention, this takes place in the evaporation vessel 8 so that the solids remain in suspension and may be continuously run off with the concentrated acid without settling on the heat exchanger surfaces, as would be the case if evaporation were to take place there as well.

EXAMPLE 2

High concentration stage 75 to 98% $H_2SO_4$

Conditions in the evaporation vessel 8:

| Concentration | X = 98% $H_2SO_4$ | |
|---|---|---|
| Temperature | t = 240° C. | |
| Pressure | p = 60 Torr | 0.08 bar abs |

Sulphuric acid in the heat exchanger:

| Entry temperature | t1 = 240° C. | |
|---|---|---|
| Exit temperature | t2 = 260° C. | |
| Exit pressure | p2 = 410 Torr | 0.55 bar abs |

Circulation volume (sulphuric acid) for an output of 1000 kg/h of $H_2SO_4$ 100% in the case of concentration from 75 to 98% $H_2SO_4$:
m = 8.056 kg/s
$u_1$ = 17.9 m³/h at t = 240° C.

Heat carrier data:

| Entry temperature (inlet 4) | t1 = 310° C. |
|---|---|
| Exit temperature (outlet 6) | t2 = 290° C. |
| Flow volume at 310° C. | $\dot{V}_1$ = 26.1 m³/h |

Enamel compression:

For acid and heat carrier flow rates of 1 m/s, the permitted residual compression according to the invention does not fall below 0.003 m/1 m (corresponding to 20%).

We claim:

1. A circulation evaporator for concentrating mineral acid, particularly sulphuric acid, comprising parts of, or at least coated with, enamel, characterised by a heat exchanger for heating the acid comprising at least one acid feed pipe provided with an enamel layer, means being provided to maintain the compressive stress in the enamel layer under all working conditions, said acid feed pipe being connected at its inlet end to a circulation pump and at its outlet end to a flash evaporator for concentrating the heated acid, this evaporator being connected by a circulation pipe to the pump inlet and to means for introducing the crude acid, for discharging the concentrate and for carrying away the vapours.

2. A circulation evaporator as claimed in claim 1, characterised in that means for limiting the temperature difference between the pipe wall and the enamel layer are provided in order to maintain the compressive stress in the enamel layer.

3. A circulation evaporator as claimed in claim 2, characterised in that the heat exchanger is formed by a tubular coil of which the outlet is connected by a riser to an evaporation vessel of the flash evaporator, the height or fittings of the riser being adapted to maintain a static pressure at the outlet end of the tubular coil sufficient to prevent the acid from evaporating in the tubular coil.

4. A circulation evaporator as claimed in claim 3, characterised in that the tubular coil of the heat exchanger forms a shallow spiral which climbs from its inlet to its outlet end and which consists of straight pipe sections which are interconnected in series by pipe bends and each of which is surrounded by a heating jacket, the heating jackets being interconnected in series and filled with a heat carrier circulating in countercurrent to the acid, and the pipe bends consisting of flange-connected 90°-double bends.

5. A circulation evaporator as claimed in claim 4, characterised in that the riser, the circulation pipe and the heating jackets contain expansion compensators.

6. A circulation evaporator as claimed in claim 1, characterised in that the heat exchanger comprises straight pipe sections connected parallel to one another to a distributing pipe and a connecting pipe.

* * * * *